(12) United States Patent
Brock et al.

(10) Patent No.: US 11,794,894 B2
(45) Date of Patent: Oct. 24, 2023

(54) LANDING APPARATUSES FOR UNMANNED AERIAL VEHICLES

(71) Applicant: Ford Global Technologies, LLC, Dearborn, MI (US)

(72) Inventors: Nelson Brock, Palo Alto, CA (US); James Carthew, Oakland, CA (US); Richard Wykoff, Commerce Township, MI (US); Raj Sohmshetty, Canton, MI (US); Michael Azzouz, Dearborn Heights, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 850 days.

(21) Appl. No.: 16/588,650

(22) Filed: Sep. 30, 2019

(65) Prior Publication Data

US 2021/0094687 A1 Apr. 1, 2021

(51) Int. Cl.
*B64C 39/02* (2023.01)
*B64U 70/00* (2023.01)
*B64U 80/86* (2023.01)
*B64U 10/13* (2023.01)
(Continued)

(52) U.S. Cl.
CPC ............ *B64C 39/022* (2013.01); *B64U 10/13* (2023.01); *B64U 30/20* (2023.01); *B64U 50/13* (2023.01); *B64U 70/00* (2023.01); *B64U 80/86* (2023.01)

(58) Field of Classification Search
CPC ........ B64C 2201/108; B64C 2201/165; B64C 2201/18; B64C 2201/208; B64C 39/022; B64U 10/60; B64U 70/92; B64U 70/93; B64U 80/86; B64U 60/50; B64F 3/00; B64F 3/02
See application file for complete search history.

(56) References Cited

U.S. PATENT DOCUMENTS 3,381,922 A * 5/1968 Laing .................... B64C 39/022
244/17.17
7,149,611 B2 12/2006 Beck et al.
(Continued)

FOREIGN PATENT DOCUMENTS

CN 109383835 A * 2/2019
EP 3069995 B1 3/2018
(Continued)

OTHER PUBLICATIONS

Hillary Grigonis, "Watch Land Rover's search and rescue SUV launch infrared-equipped drones", Digital Trends, Mar. 7, 2017, 12 pages.
(Continued)

*Primary Examiner* — Philip J Bonzell
*Assistant Examiner* — Justin Michael Heston
(74) *Attorney, Agent, or Firm* — Brandon Hicks; Eversheds Sutherland (US) LLP

(57) ABSTRACT

Landing apparatuses for unmanned aerial vehicles are provided herein. An example UAV includes a frame; a propeller rotatably coupled to the frame; and a landing guard armature extending from the frame. A terminal end of the landing guard armature extends beyond a propeller radius of the propeller. The landing guard armature has a surface area that is sized to promote airflow around the landing guard armature.

16 Claims, 3 Drawing Sheets

(51) Int. Cl.
*B64U 30/20* (2023.01)
*B64U 50/13* (2023.01)

(56) References Cited

U.S. PATENT DOCUMENTS

| | | | |
|---|---|---|---|
| 2009/0008499 A1* | 1/2009 | Shaw | B64C 27/20 244/17.23 |
| 2015/0102154 A1 | 4/2015 | Duncan et al. | |
| 2016/0144982 A1 | 5/2016 | Sugumaran | |
| 2016/0364989 A1 | 12/2016 | Speasl et al. | |
| 2017/0129603 A1* | 5/2017 | Raptopoulos | B64C 39/024 |
| 2017/0137125 A1* | 5/2017 | Kales | B64C 39/024 |
| 2018/0117981 A1* | 5/2018 | Lacaze | B62D 55/30 |
| 2018/0170414 A1* | 6/2018 | Arndt | B61L 25/023 |
| 2019/0106224 A1* | 4/2019 | Nishikawa | B64D 27/24 |
| 2019/0308724 A1* | 10/2019 | Cooper | B64C 39/024 |
| 2019/0359329 A1* | 11/2019 | Gavrilov | B64U 80/86 |
| 2020/0031473 A1* | 1/2020 | Martens | B64F 1/125 |
| 2020/0216196 A1* | 7/2020 | Sohmshetty | B64F 3/00 |
| 2021/0129982 A1* | 5/2021 | Collins | B64F 3/02 |
| 2021/0269149 A1* | 9/2021 | Culver | B64C 39/024 |

FOREIGN PATENT DOCUMENTS

| | | | | |
|---|---|---|---|---|
| GB | 2559580 A * | 8/2018 | | B64C 39/024 |
| WO | WO-2016022646 A1 * | 2/2016 | | B64C 39/024 |

OTHER PUBLICATIONS

Tim Stenovec, "Watch a Drone Land Perfectly on the Roof of a Speeding Car", Tech Insider, Jan. 21, 2016, 6 pages.
Chris Mills, "Autonomous Drones Can Land on Moving Cars Now", GIZMODO, Jan. 20, 2016, 2 pages.

* cited by examiner

LANDING APPARATUSES FOR UNMANNED AERIAL VEHICLES

TECHNICAL FIELD

The present disclosure relates to unmanned aerial vehicles (UAV) and more particularly to landing apparatuses for UAVs that incorporated guided UAV docking mechanisms.

BACKGROUND

Multi-copter UAVs are capable of Vertical Take-Off and Landing (VTOL). Landing a UAV on a moving vehicle can be complicated by the surrounding area of aerodynamic influence created by the moving vehicle. Landing a UAV in a specific position and/or orientation is a difficult endeavor. Also, motion of a vehicle may jostle the UAV during landing or take-off procedures. Also, current methods and systems for landing UAVs require the operator to leave the vehicle.

BRIEF DESCRIPTION OF THE DRAWINGS

The detailed description is set forth with reference to the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

DETAILED DESCRIPTION

Overview

The present disclosure is directed, in some embodiments, UAV landing apparatuses or systems that provide for consistent and repeatable UAV landing. In some embodiments, a landing compartment of a landing apparatus and a UAV are each modified or configured to ensure that the UAV is positioned or oriented within the landing compartment of a landing apparatus in a consistent manner. For example, the UAV can comprise landing guards that are configured to cooperate with sidewalls of a landing compartment to direct or guide the UAV into a specific position or orientation within the landing compartment.

According to some embodiments, the landing apparatus may include an actuated roof for enclosing the UAV within the landing compartment. In various embodiments, control of the actuated roof can be predicated upon a location of the UAV relative to the landing apparatus. In one or more embodiments, the UAV can be instructed to take off and land when discrepancies in position or orientation of the UAV within the landing apparatus are determined.

Illustrative Embodiments

Figure 1:
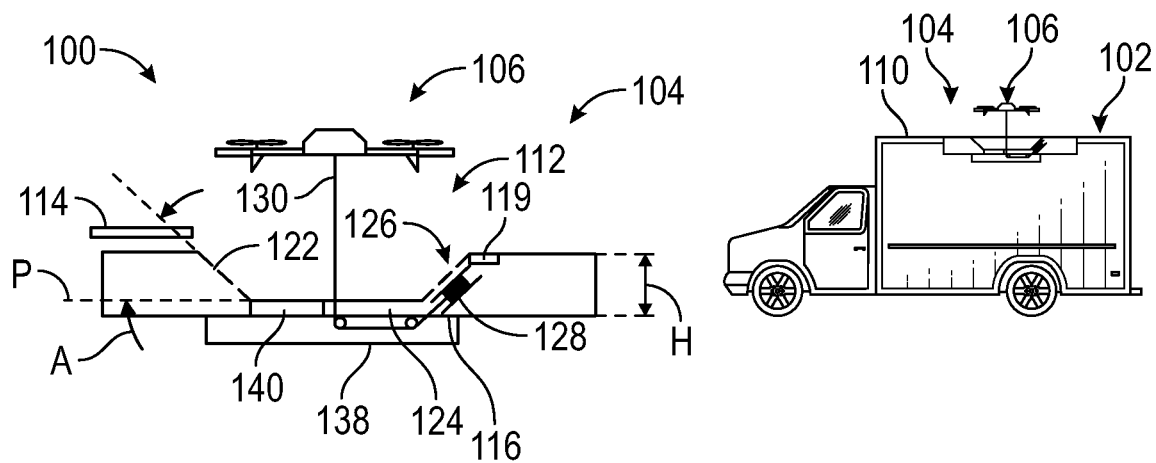
FIG. 1 depicts an illustrative architecture in which techniques and structures for providing the systems and methods disclosed herein may be implemented, including a UAV landing apparatus or system of the present disclosure in an open configuration.
Figure 1:
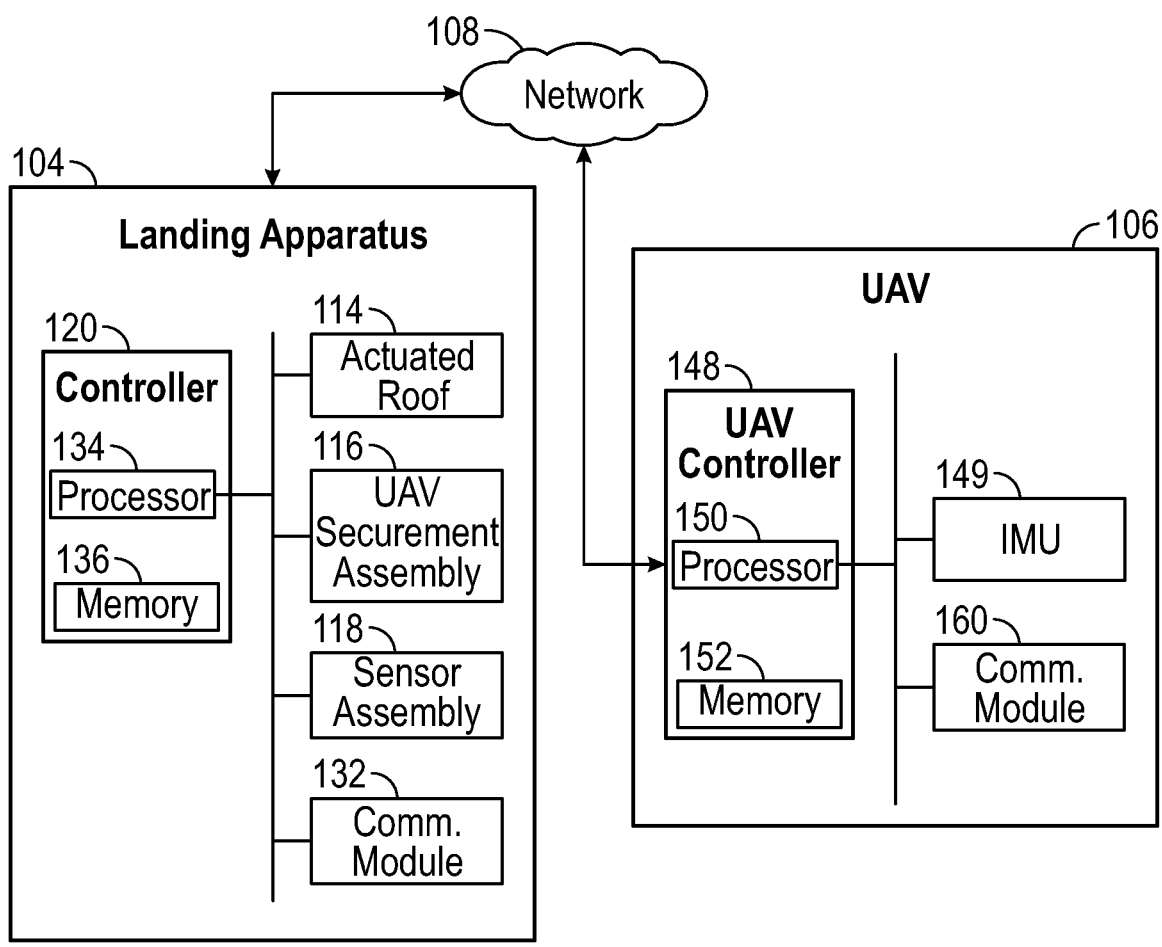
Figure 2:
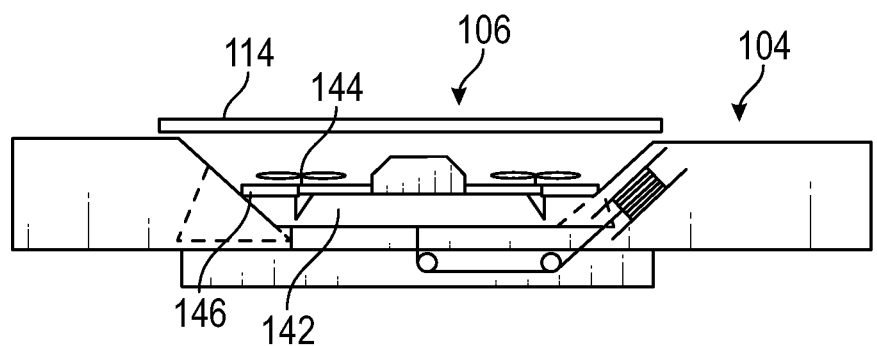
FIG. 2 depicts a UAV landing apparatus of the present disclosure in a closed configuration.

Turning now to the drawings, FIGS. 1 and 2 collectively depict an illustrative architecture 100 in which techniques and structures of the present disclosure may be implemented. The illustrative architecture 100 may include a vehicle 102, a landing apparatus 104, a UAV 106, and a network 108. In some embodiments, the objects in FIG. 1 can communicate over the network 108. The network 108 may include any one or a combination of multiple different types of networks, such as cable networks, the Internet, wireless networks, and other private and/or public networks. In some instances, the network 108 may include cellular, Wi-Fi, or Wi-Fi direct.

The vehicle 102 can include any desired vehicle that has been configured to incorporate the landing apparatus 104. In some embodiments, the landing apparatus 104 is integrated into a roof 110 of the vehicle 102. As will be discussed in greater detail herein, the landing apparatus 104 is configured to allow a user within the vehicle to access the UAV 106 when it is disposed inside of the landing apparatus 104. In one example embodiment, the landing apparatus 104 is a self-contained unit that can be drop-fit into an opening of the vehicle 102, such as a sunroof. In other embodiments, the landing apparatus 104 can be integrated into a portion of the frame of the vehicle 102 such as the roof panel.

In general, the landing apparatus 104 comprises a landing compartment 112, an actuated roof 114, a UAV securement assembly 116, a sensor assembly 118, and a controller 120. The landing compartment 112 can comprise a sidewall 122 and a landing surface 124. The sidewall 122 of the landing compartment cooperates with landing surface 124 to define an interior space of the landing compartment 112 that receives the UAV 106. In some embodiments, the sidewall 122 and the landing surface 124 can have an inverse, frusto-conically shaped bowl that is shaped to receive the UAV 106. In some embodiments, the landing surface 124 is substantially flat and the sidewall 122 extends from a plane P of the landing surface 124 at an angle A. In some embodiments, the sidewall 122 can function to direct the UAV 106 into a desired position/orientation within the landing compartment 112. The angle A selected can vary according to design requirements, such as a shape or size of the UAV 106. Also, the sidewall 122 has a height dimension H that is selected to accommodate the UAV 106.

In various embodiments, the sidewall 122 and/or the landing surface 124 can have perforations 126 that allow airflow produced by the UAV 106 to pass through the sidewall 122 and/or the landing surface 124. To be sure, airflow produced by the UAV 106 may reflect off of adjacent surfaces and disturb the aerodynamic stability of the UAV 106 by producing airflow turbulence. The perforations 126 can reduce or eliminate reflected airflow. The size, shape, and number of perforations 126 can vary according to design parameters, such as expected UAV airflow.

The actuated roof 114 can transition between an open position as illustrated in FIG. 1, and a closed position in FIG. 2. Generally, when the actuated roof 114 is in the open position the UAV 106 can launch from, or land within, the landing compartment 112. The actuated roof 114 can be translated using a motor or any other suitable mechanism, apparatus, or device. In some embodiments, the actuated roof 114 need not be actuated but can be a manually removable and replaceable cover. In general, the actuated roof 114 can be operated through the controller 120, as will be discussed in greater detail herein.

In one or more embodiments, the UAV securement assembly 116 can include a reel 128 and tether 130. The reel 128 can be configured to spool and/or unspool the tether 130. In some embodiments, the reel 128 is operated using a motor to spool and/or unspool the tether 130. In various embodiments, one end of the tether 130 is attached to the UAV 106. Broadly, the UAV 106 can be retrieved and guided into the landing compartment 112 using the reel 128 and tether 130 (also with the aid of landing guard armatures as disclosed in greater detail herein). In general, the UAV securement assembly 116 can be operated through the controller 120, as will be discussed in greater detail herein.

In various embodiments, rather than using a tether and reel, the UAV securement assembly 116 could include an electromagnet integrated into the landing compartment 112, which cooperates with magnetic elements of the UAV 106. In another embodiment, the UAV securement assembly 116 may include selectively operable mechanical grasping elements.

In various instances, the sensor assembly 118 can include one or more sensors that are capable of sensing UAV 106 is stationary and level relative to the landing surface 124 of the landing compartment 112. In some embodiments, these data can be improved or verified using output of an inertial measurement unit (IMU) incorporated into the UAV 106, as will be discussed in greater detail herein with reference to embodiments of the UAV 106.

In one or more embodiments, the sensor assembly 118 can include one or more sensors that are capable of sensing if a portion of the UAV may contact the actuated roof 114 if the actuated roof 114 were to be closed. For example, the sensor could include a light curtain sensor, an ultrasonic sensor, an infrared sensor, a laser sensor, or combinations thereof. In some embodiments, a light curtain sensor 119 of the sensor assembly 118 can be disposed below the actuated roof 114 but above the interior space of the landing compartment 112 that receives the UAV 106. The light curtain sensor 119 can be aligned with a location that is approximately or exactly the height H of the sidewall 122 of the landing compartment 112.

The sensor assembly 118 can include one or more sensors that are capable of sensing if the UAV 106 is in a desired landing position/orientation. In general, each of the sensor(s) including sensor assembly 118 provide signals to the controller 120 that can be used to control operations of the landing apparatus 104 and/or the UAV 106. In one example, the sensor(s) could include pressure sensors that sense a weight of the UAV 106 distributed over the landing surface 124. These pressure sensors may be integrated into or otherwise associated with the landing surface 124.

According to some embodiments, the landing apparatus 104 can comprise a communications module 132 that allows the controller 120 to communicate with the UAV 106. In some embodiments, sensor data obtained from sensor assembly 118 can be provided to the UAV 106 using the communications module 132 over the network 108. The controller 120 can also provide status information for various components of the landing apparatus 104 to the UAV 106. For example, an open or closed status of the actuated roof 114 can be transmitted to the UAV 106. These data may allow or prevent the UAV 106 from launching. In some embodiments, launching of the UAV 106 can be controlled solely by the controller 120 of the landing apparatus 104. In other embodiments, the UAV 106 can utilize these data in an automated or self-launching decision-making process executed by the UAV 106 (and specifically a UAV controller disclosed infra).

According to some embodiments, the controller 120 may comprise a processor 134 and memory 136. The memory 136 stores instructions that can be executed by the processor 134 to perform UAV and landing apparatus 104 control operations as disclosed throughout. When referring to operations executed by the controller 120 it will be understood that this includes the execution of instructions by the processor 134.

In one embodiment, the controller 120 is configured to operate the actuated roof 114. For example, the controller 120 can cause the actuated roof 114 to translate between either a closed configuration or an open configuration. The controller 120 can also determine a current configuration of the actuated roof 114 (e.g., whether it is open or closed). In some embodiments, the controller 120 can condition launching of the UAV 106 to situations only when the actuated roof 114 is in the open configuration. The controller 120 can condition landing of the UAV 106 to situations only when the actuated roof 114 is in the open configuration. As noted above, the controller 120 can inform the UAV 106 as to the current configuration of the actuated roof 114. The UAV 106 may also transmit a request to the controller 120 to open or close the actuated roof 114.

As noted above, based on sensor data obtained from the sensor assembly 118, the controller 120 may determine when the actuated roof 114 should not be closed based on a determination that a portion of the UAV 106 would impact the actuated roof 114 if the actuated roof 114 were to be closed. For example, if the UAV 106 is positioned in the landing compartment 112 such that a portion of the UAV 106 is at or above the height H of the sidewall 122 of the landing compartment 112, the controller 120 can prevent the actuated roof 114 from closing. These data could be obtained from output of the light curtain sensor 119. Stated otherwise, the controller 120 can be configured to determine if a portion of the UAV 106 may contact the actuated roof 114 that can be used to cover the landing compartment 112, and to prevent the closure of the actuated roof in response.

The controller 120 can also be configured to prevent the UAV 106 from launching when the actuated roof 114 is not open. The controller 120 can also prevent the closure of the actuated roof 114 when the UAV 106 is in flight. This feature can be advantageous embodiments where a tether is used with UAV 106. Extension or retraction of the tether 130 may be impacted if the actuated roof 114 were to be closed when the UAV 106 is in flight.

Also, as noted above, the controller 120 may be configured to determine when the UAV 106 is incorrectly positioned in the landing compartment 112. The controller 120 can be configured to instruct the UAV 106 to launch and land to reposition the UAV 106 within the landing compartment 112. For example, if the sensor assembly 116 senses that a pressure distribution created by the weight of the UAV 106 is incorrect the controller 120 can instruct the UAV 106 to launch and land to reposition the UAV 106 within the landing compartment 112. When the UAV securement assembly 116 is utilized, the controller 120 can be configured to operate the UAV securement assembly 116 to enable securement or release of the UAV 106 for flight.

In one example use case, if the UAV 106 desires to launch, the controller 120 may confirm that the actuated roof 114 is open (if not the controller 120 can open the actuated roof 114). The controller 120 can cause the reel 128 to release the tether 130, which allows the UAV 106 to launch.

According to some embodiments, the landing apparatus 104 can also include optional features such as a drip pan 138 and/or an access opening 140 in the landing surface 124. The drip pan 138 can be disposed below the landing compartment 112 to catch fluid, such as rain that may pass through the perforations 126 in the landing compartment 112. The access opening 140 provides a means by which a user within the vehicle 102 can access the UAV 106. The user may desire to access the UAV 106 for maintenance purposes, for example to switch out a battery of the UAV 106. An electrical connection to the UAV can be facilitated through the access opening 140 to allow for battery charging while the UAV 106 is within the landing compartment 112.

In another embodiment, the landing surface 124 of the landing compartment 112 can be hingedly attached to the sidewall 122, allowing for access to the UAV 106 within the landing compartment 112. In some embodiments, the landing surface 124 of the landing compartment 112 can be releasably attached to the sidewall 122. For example, the landing surface 124 can detachably couple through threaded connections or a contact fit.

According to some embodiments, the UAV 106 can generally comprise a frame 142, a propeller 144, a landing guard armature 146, and a controller 148. According to some embodiments, the controller 148 may comprise a processor 150 and memory 152. The memory 152 stores instructions that can be executed by the processor 150 to perform UAV and landing apparatus 104 control operations as disclosed throughout. When referring to operations executed by the controller 148 it will be understood that this includes the execution of instructions by the processor 150. Any references to operations performed by the UAV 106 will be understood to include operations performed through use of the controller 148.

The UAV 106 can also include a communications module 160 that allows the controller 148 to access the network 108 (see FIG. 1). The controller 148 of the UAV 106 can communicate with the controller 120 of the landing apparatus 104 to perform any of the UAV launch and landing procedures described herein. In some embodiments, the controller 148 can determine if the UAV 106 is stationary and/or level through sensor measurements. For example, the UAV 106 can include an inertial measurement unit (IMU) 149 that senses an orientation of the UAV 106.

Figure 3A:
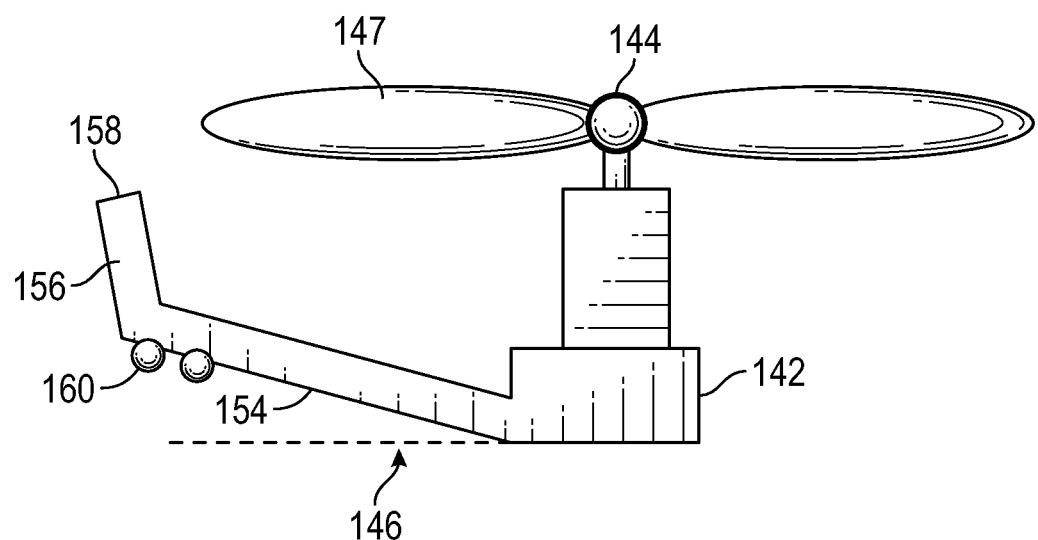
FIG. 3A depicts a side view of a portion of a UAV having a landing guard armature.
Figure 3B:
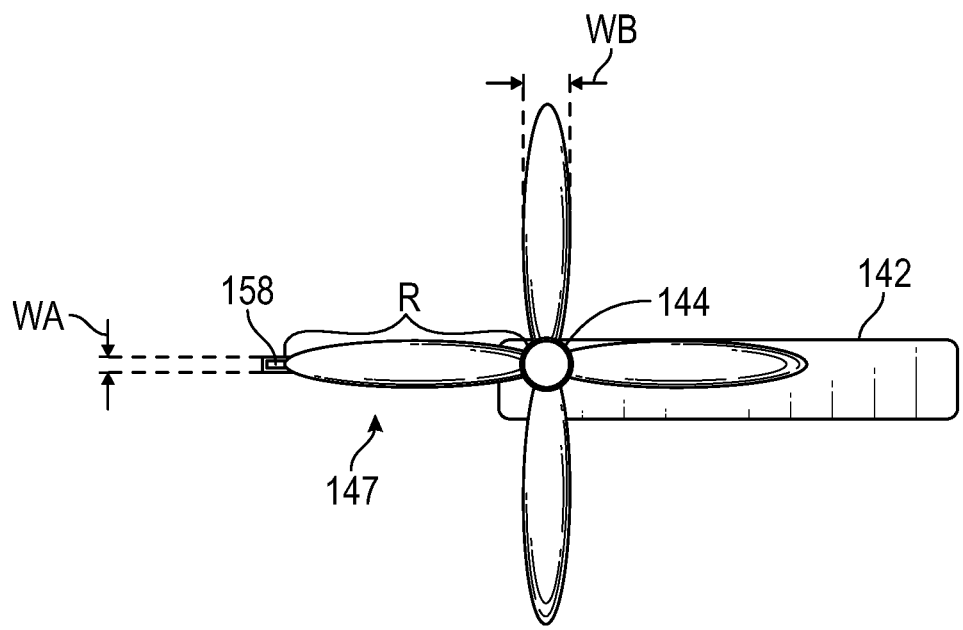
FIG. 3B depicts a top-down view of FIG. 3A.

Referring now to FIGS. 3A-3B, which illustrate various aspects of the UAV 106. In more detail, FIGS. 3A and 3B illustrate the structural relationship between the propeller 144 and the landing guard armature 146. In general, the UAV 106 can have a plurality of propellers, which can each be associated with a landing guard armature. In some embodiments, the propeller 144 includes a plurality of blades, such as blade 147. The blade 147 has a surface area defined by its width $W_B$ and length. Generally, the length of the blade 147 is equivalent to a propeller radius R.

The landing guard armature 146 may be a thin member that has a relatively smaller surface area than that of the blade 147. For example, at least a width dimension $W_A$ of the landing guard armature 146 is smaller than the width $W_B$ of the blade 147. This relative difference in surface area (or at least relative width) promotes airflow around the landing guard armature 146. That is, the landing guard armature 146, when configured according to the present disclosure, may not impede airflow around the propeller 144.

Referring to FIGS. 1 and 3A-3B collectively, the landing guard armature 146 has a shape that substantially conforms to the sidewall 122, of the landing apparatus 104. In some embodiments, when the UAV 106 is landing, the landing guard armature 146 contacts the sidewall 122 of the landing compartment 112. Due to the angle of the sidewall 122, the UAV 106 is directed downwardly into a desired landing position/orientation within the landing compartment 112 of the landing apparatus 104. In various embodiments, the landing guard armature 146 and the sidewall 122 have a complementary shape that allows the UAV 106 to nest within the landing compartment 112. When the UAV 106 has multiple propellers and landing guard armatures, each of the landing guard armatures may contact the sidewall 122 when the UAV 106 is landing. In various embodiments, an overall outer dimension of the UAV 106 that is defined from the tip of one landing guard armature to the tip of another opposing landing guard armature is substantially equivalent to inner dimensions of the landing compartment 112. This cooperative sizing between the UAV 106 and the landing compartment 112 of the landing apparatus 104 allows the UAV 106 to nest inside the landing compartment 112.

Generally, the landing guard armature(s) protect the propeller(s), as well as allow for self-alignment of the UAV 106 during landing (based on the complementary shapes of the landing guard armature(s) and the sidewall of the landing compartment). The use of landing guard armature(s) also provides for accurate and consistent positioning of the UAV when it lands. Also, the landing guard armature 146 may be located away from the propeller 144 in such a way that a cavity C or opening is formed there between to further promote airflow around the propeller 144.

In some embodiments, the landing guard armature 146 includes a first portion 154 that extends away from the frame 142 in such a way that the first portion 154 is positioned below the propeller 144. The landing guard armature 146 includes a second portion 156 that angles upwardly from the first portion 154. In some embodiments, a terminal end 158 of the second portion 156 of the landing guard armature 146 extends beyond the propeller radius R of the propeller 144. That is, the terminal end 158 of the second portion 156 extends past a tip of the blade 147 of the propeller 144 to ensure that the blade 147 does not contact the landing apparatus 104 during UAV operation. In some embodiments, only the first portion 154 of the landing guard armature 146 has a shape that corresponds to the sidewall 122 of the landing compartment 112. For example, an angle of the first portion 154 measured relative to the frame 142 substantially corresponds to the angle A of the sidewall 122. To be sure, the correspondence in angles need not be identical in some embodiments, but a tolerance or difference between these angles may be permitted. In a non-limiting example, a five to seven percent difference in the angles may be permitted.

In some embodiments, the landing guard armature may comprise at least one of a wheel, a bearing, a roller, a low-friction coating. For example, a wheel 160 may be applied to the first portion 154 of the landing guard armature 146. Wheels may be placed along both or either of the first portion 154 and/or the second portion 156.

Figure 4:
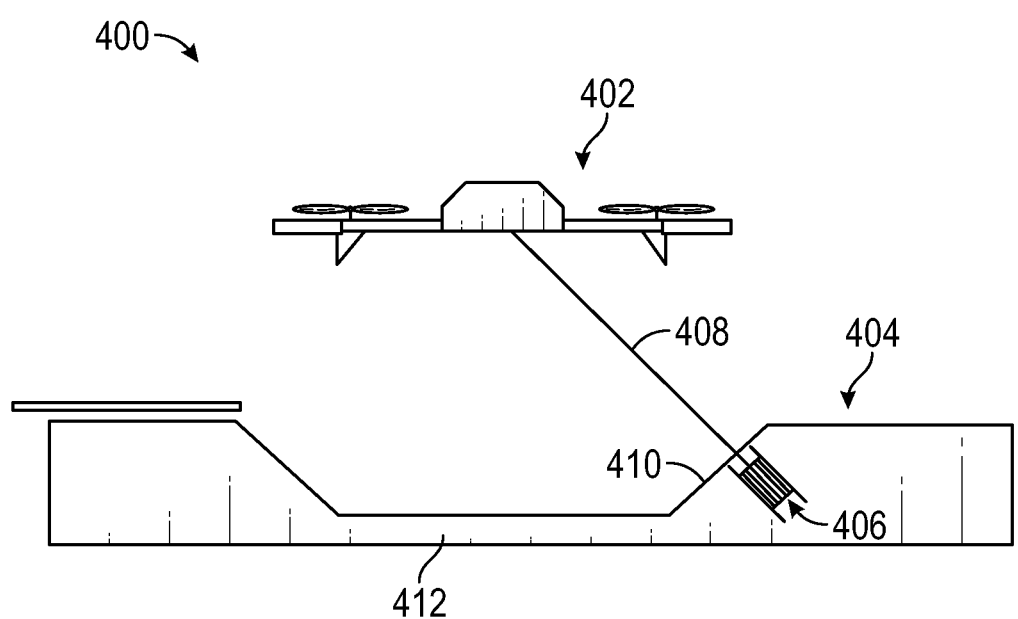
FIG. 4 depicts another example UAV landing apparatus or system of the present disclosure.

FIG. 4 illustrates another example system of the present disclosure. The system 400 generally includes a UAV 402 and a landing apparatus 404. The UAV 402 can be constructed similarly to the UAV 106 disclosed above. The landing apparatus 404 is similarly constructed to the landing apparatus 104 of FIG. 1, with the exception of having a securement assembly 406 having a tether 408 that extends through a sidewall 410 of the landing apparatus 404, rather than through a landing surface 412 of the landing apparatus 404.

In the above disclosure, reference has been made to the accompanying drawings, which form a part hereof, which illustrate specific implementations in which the present disclosure may be practiced. It is understood that other implementations may be utilized, and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, one skilled in the art will recognize such feature, structure, or characteristic in connection with other embodiments whether or not explicitly described.

Implementations of the systems, apparatuses, devices, and methods disclosed herein may comprise or utilize a special purpose or general-purpose computer including computer hardware, such as, for example, one or more processors and system memory, as discussed herein. Implementations within the scope of the present disclosure may also include physical and other computer-readable media for carrying or storing computer-executable instructions and/or data structures. Such computer-readable media can be any available media that can be accessed by a general purpose or special purpose computer system. Computer-readable media that stores computer-executable instructions is computer storage media (devices). Computer-readable media that carries computer-executable instructions is transmission media. Thus, by way of example, and not limitation, implementations of the present disclosure can comprise at least two distinctly different kinds of computer-readable media: computer storage media (devices) and transmission media.

Computer storage media (devices) includes RAM, ROM, EEPROM, CD-ROM, solid state drives (SSDs) (e.g., based on RAM), flash memory, phase-change memory (PCM), other types of memory, other optical disk storage, magnetic disk storage or other magnetic storage devices, or any other medium which can be used to store desired program code means in the form of computer-executable instructions or data structures and which can be accessed by a general purpose or special purpose computer.

An implementation of the devices, systems, and methods disclosed herein may communicate over a computer network. A "network" is defined as one or more data links that enable the transport of electronic data between computer systems and/or modules and/or other electronic devices. When information is transferred or provided over a network or another communications connection (either hardwired, wireless, or any combination of hardwired or wireless) to a computer, the computer properly views the connection as a transmission medium. Transmission media can include a network and/or data links, which can be used to carry desired program code means in the form of computer-executable instructions or data structures and which can be accessed by a general purpose or special purpose computer. Combinations of the above should also be included within the scope of computer-readable media.

Computer-executable instructions comprise, for example, instructions and data which, when executed at a processor, cause a general purpose computer, special purpose computer, or special purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the present disclosure may be practiced in network computing environments with many types of computer system configurations, including in-dash vehicle computers, personal computers, desktop computers, laptop computers, message processors, handheld devices, multi-processor systems, microprocessor-based or programmable consumer electronics, network PCs, minicomputers, mainframe computers, mobile telephones, PDAs, tablets, pagers, routers, switches, various storage devices, and the like. The disclosure may also be practiced in distributed system environments where local and remote computer systems, which are linked (either by hardwired data links, wireless data links, or by any combination of hardwired and wireless data links) through a network, both perform tasks. In a distributed system environment, program modules may be located in both the local and remote memory storage devices.

Further, where appropriate, the functions described herein can be performed in one or more of hardware, software, firmware, digital components, or analog components. For example, one or more application specific integrated circuits (ASICs) can be programmed to carry out one or more of the systems and procedures described herein. Certain terms are used throughout the description and claims refer to particular system components. As one skilled in the art will appreciate, components may be referred to by different names. This document does not intend to distinguish between components that differ in name, but not function.

It should be noted that the sensor embodiments discussed above may comprise computer hardware, software, firmware, or any combination thereof to perform at least a portion of their functions. For example, a sensor may include computer code configured to be executed in one or more processors and may include hardware logic/electrical circuitry controlled by the computer code. These example devices are provided herein for purposes of illustration and are not intended to be limiting. Embodiments of the present disclosure may be implemented in further types of devices, as would be known to persons skilled in the relevant art(s).

At least some embodiments of the present disclosure have been directed to computer program products comprising such logic (e.g., in the form of software) stored on any computer-usable medium. Such software, when executed in one or more data processing devices, causes a device to operate as described herein.

While various embodiments of the present disclosure have been described above, it should be understood that they have been presented by way of example only, and not limitation. It will be apparent to persons skilled in the relevant art that various changes in form and detail can be made therein without departing from the spirit and scope of the present disclosure. Thus, the breadth and scope of the present disclosure should not be limited by any of the above-described exemplary embodiments but should be defined only in accordance with the following claims and their equivalents. The foregoing description has been presented for the purposes of illustration and description. It is not intended to be exhaustive or to limit the present disclosure to the precise form disclosed. Many modifications and variations are possible in light of the above teaching. Further, it should be noted that any or all of the aforementioned alternate implementations may be used in any combination desired to form additional hybrid implementations of the present disclosure. For example, any of the functionality described with respect to a particular device or component may be performed by another device or component. Further, while specific device characteristics have been described, embodiments of the disclosure may relate to numerous other device characteristics. Further, although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments.

That which is claimed is:

1. A system, comprising an unmanned aerial vehicle, the unmanned aerial vehicle comprising: a frame; a propeller rotatably coupled to the frame; and a landing guard armature extending from the frame, wherein a terminal end of the landing guard armature extends beyond a propeller radius of the propeller, and wherein the landing guard armature has a surface area that is sized to promote airflow around the landing guard armature, and wherein the landing guard armature is a thin plate comprising: a first portion that extends away from the frame in such a way that the first portion is positioned below the propeller; and a second portion that angles upwardly from the first portion configured to prevent the propeller from coming into contact with a landing apparatus which receives the unmanned aerial vehicle, the landing apparatus comprising a landing compartment having a flat landing surface and a sidewall extending upwardly from the landing surface at a first angle with respect to the landing surface, the first angle being an obtuse angle wherein the first portion extends upwardly from the frame at a second angle from the frame, the second angle being an acute angle, and wherein a difference between the first angle and the second angle is ninety degrees in order to allow the unmanned aerial vehicle to nest within the landing compartment.

2. The unmanned aerial vehicle according to claim 1, wherein at least one of the first portion or the second portion comprises at least one of a wheel, a bearing, a roller, a low-friction coating, or combinations thereof.

3. The unmanned aerial vehicle according to claim 1, wherein the surface area of the landing guard armature and a width dimension of the landing guard armature are smaller than a surface area and a width of a blade of the propeller.

4. The unmanned aerial vehicle according to claim 1, wherein the landing guard armature is located from the propeller in such a way that a cavity or opening is formed there between to further promote airflow.

5. A system, comprising:
a landing apparatus comprising a landing compartment, the landing compartment comprising a flat landing surface and a sidewall extending upwardly from the landing surface at a first angle with respect to the landing surface, the first angle being an obtuse angle; and
an unmanned aerial vehicle, comprising:
a frame;
a propeller rotatably coupled to the frame; and
a landing guard armature extending from the frame, wherein the landing guard armature has a surface area that is sized to promote airflow around the landing guard armature and substantially corresponds in shape to the sidewall, and wherein the landing guard armature is a thin plate comprising:
a first portion that extends away from the frame in such a way that the first portion is positioned below the propeller, wherein the first portion extends upwardly from the frame at a second angle from the frame, the second angle being an acute angle; and
a second portion that angles upwardly from the first portion configured to prevent the propeller from coming into contact with the landing apparatus,
wherein the landing apparatus is integrated in a roof of a vehicle, wherein the surface area of the landing guard armature and a width dimension of the landing guard armature are smaller than a surface area and a width of a blade of the propeller, wherein the processor is configured to prevent the unmanned aerial vehicle from launching when the actuated roof is not open, as well as prevent closure of the actuated roof when the unmanned aerial vehicle is in flight, and wherein a difference between the first angle and the second angle is ninety degrees in order to allow the unmanned aerial vehicle to nest within the landing compartment.

6. The system according to claim 5, further comprising a securement assembly comprising:
a reel; and
a tether coupled to the reel and the unmanned aerial vehicle.

7. The system according to claim 5, wherein the sidewall of the landing compartment cooperates with the landing surface of the landing compartment to define the landing compartment.

8. The system according to claim 7, wherein at least one of the sidewall or the landing surface are perforated to reduce an amount of airflow created by the propeller from reflecting off of the sidewall or the landing surface and creating flight instability.

9. The system according to claim 8, further comprising a drip plate positioned below the landing compartment to receive a fluid that passes through perforations of the sidewall or the landing surface.

10. The system according to claim 7, further comprising an opening in the landing surface that provides access to the unmanned aerial vehicle when the unmanned aerial vehicle is within the landing compartment.

11. The system according to claim 5, further comprising an actuated roof that covers the landing compartment to enclose the unmanned aerial vehicle.

12. The system according to claim 5, further comprising a controller, the controller comprising a processor and memory, the processor is configured to execute instructions stored in the memory to determine when the unmanned aerial vehicle is stationary and level.

13. The system according to claim 12, wherein the controller is configured to determine, via one or more sensors, if a portion of the unmanned aerial vehicle will contact an actuated roof that covers the landing compartment, and to prevent closure of the actuated roof in response.

14. The system according to claim 13, wherein the processor is configured to instruct the unmanned aerial vehicle to launch and land to reposition the unmanned aerial vehicle within the landing compartment responsive to a determination that a pressure distribution created by the weight of the unmanned aerial vehicle is incorrect.

15. A method, comprising:
  position a landing apparatus comprising a landing compartment within a vehicle, the landing compartment comprising a flat landing surface and a sidewall extending upwardly from the landing surface at a first angle with respect to the landing surface, the first angle being an obtuse angle; and
  receiving, by the landing apparatus, an unmanned aerial vehicle comprising:
    a frame;
    a propeller rotatably coupled to the frame; and
    a landing guard armature extending from the frame, wherein the landing guard armature has a surface area that is sized to promote airflow around the landing guard armature and substantially corresponds in shape to the sidewall, and wherein the landing guard armature is a thin plate comprising:
      a first portion that extends away from the frame in such a way that the first portion is positioned below the propeller, wherein the first portion extends upwardly from the frame at a second angle from the frame, the second angle being an acute angle; and
      a second portion that angles upwardly from the first portion configured to prevent the propeller from coming into contact with the landing apparatus,
    wherein the landing apparatus is integrated in a roof of a vehicle, wherein the surface area of the landing guard armature and a width dimension of the landing guard armature are smaller than a surface area and a width of a blade of the propeller, wherein the processor is configured to prevent the unmanned aerial vehicle from launching when the actuated roof is not open, as well as prevent closure of the actuated roof when the unmanned aerial vehicle is in flight, and wherein a difference between the first angle and the second angle is ninety degrees in order to allow the unmanned aerial vehicle to nest within the landing compartment.

16. The system according to claim 5, further comprising a securement assembly comprising:
  an electromagnet integrated into the landing compartment; and
  a magnetic element provided with the unmanned aerial vehicle configured to be attracted to the electromagnet in order to allow the unmanned aerial vehicle to be guided onto the landing surface.

* * * * *